United States Patent [19]  [11]  4,115,834
Robinson et al.  [45]  Sep. 19, 1978

[54] DIELECTRIC COMPOSITION AND DEVICE CONTAINING SAME

[75] Inventors: William M. Robinson; Edward Lobo, both of New Bedford, Mass.

[73] Assignee: Cornell-Dubilier Electric Corp., Newark, N.J.

[21] Appl. No.: 716,663

[22] Filed: Aug. 23, 1976

[51] Int. Cl.$^2$ ............................................. H01G 4/22
[52] U.S. Cl. ................................... 361/318; 361/317; 252/63; 252/64; 252/65
[58] Field of Search ...................... 252/63, 64, 65, 66; 317/258, 259; 361/318, 317, 315, 314

[56] References Cited

U.S. PATENT DOCUMENTS 3,788,998  1/1974  Coquillion ............................ 361/317
3,844,968  10/1974  Jay ....................................... 361/317

Primary Examiner—Benjamin R. Padgett
Assistant Examiner—Josephine L. Barr

[57] ABSTRACT

A dielectric composition containing a major amount of a bis ($C_{6-12}$ alkyl) phthalate such as diisononyl phthalate, a minor amount of butylated monochloro diphenyl oxide, and a small effective amount of an epoxy stabilizer, and an electrical device such as a capacitor comprising metal foil electrodes separated by paper sheet and/or plastic film impregnated with said composition.

11 Claims, No Drawings

DIELECTRIC COMPOSITION AND DEVICE CONTAINING SAME

This invention relates to a dielectric composition containing a peculiarly effective mixture of dielectric materials, and to electrical devices such as a capacitor containing such composition.

Electrical capacitors and other electrical devices commonly employ dielectric fluids for cooling, for insulation and to exclude ionizable gases, the most widely used such fluids being halogenated aromatic compounds, especially polyhalogenated aromatic hydrocarbons such as trichlorodiphenyl, pentachlorodiphenyl, hexachlorodiphenyl, trichlorbenzene, tetrachlorbenzene, the corresponding halogenated naphthalenes and the like. Although these materials are quite satisfactory with respect to safety, high dielectric constants and the like, they are subject to some serious disadvantages. One such disadvantage is their tendency to break down in the presence of electrical stress or discharge, notably corona, thereby resulting in the release of deleterious by-products including corrosive hydrogen chloride, and dielectric failure. An even more important disadvantage of these polyhalogenated aromatic hydrocarbons, particularly PCB (polychlorinated biphenyls), is their recently publicized hazards to health and the environment.

It has been proposed to use diisononyl phthalate as a non- PCB dielectric fluid, but this substance has been found to degrade relatively rapidly in electrical characteristics, ionize, and have an increased power factor and a short life when employed at elevated temperatures such as about 80° to 100° C. in a capacitor.

It is an object of this invention to provide a dielectric composition which will not be subject to one or more of the above disadvantages.

Another object of this invention is the provision of a more economical dielectric composition devoid of halogenated aromatic hydrocarbons and having increased resistance to ionization and/or increased resistance to deterioration of the power factor and/or increased life when employed in a capacitor, particularly at elevated temperatures such as about 80° to 100° C.

Still another object of the invention is the provision of an electrical device such as a capacitor incorporating such dielectric compositions.

Other objects and advantages will appear as the description proceeds.

The attainment of one or more of the above objects is made possible by the present invention which includes the provision of a dielectric composition containing (a) a major amount of a bis ($C_{6-12}$ alkyl) phthalate such as diisononyl phthalate, (b) a minor amount of butylated monochloro diphenyl oxide, and (c) a small effective amount of an epoxy stabilizer. In these dielectric compositions, it has been surprisingly found that the use therein of the indicated minor amount of component (b) enables the production of electrical devices such as AC capacitors which have excellent capacitance, increased life and insulation resistance and a lower power factor when operated at about 80° to 100° C. relative to capacitors employing a dielectric composition containing (a) and (c) but no (b).

The compositions of this invention will generally contain approximately by weight, 97 to 51 parts, preferably 80 to 60 parts, and more preferably 70 to 65 parts, of component (a), 2 to 48 parts, preferably 18 to 38 parts, and more preferably 28 to 34 parts, of component (b), and 0.001 to 5 parts, preferably 0.01 to 2.0 parts, and more preferably 0.5 to 1.0 part, of component (c).

In the liquid dielectric component (a) diester, the alkyl groups may be different but are usually the same, may be straight but preferably branched, and may contain about 6 to 12, preferably 9, carbon atoms. Representative diesters of this type are the bis or di- n- or iso- hexyl, -heptyl, -octyl, -decyl, -dodecyl, and preferably -nonyl phthalates. The preferred diisononyl phthalate is commercially available as ENJ2065 (Exxon Corp.).

In the liquid dielectric component (b), commercially available as the relatively costly XFS4169L (Dow Chem. Corp.), the chloro and butyl groups are nuclearly substituted in varying positions in one or both phenyl moieties, the product being a mixture of position isomers. The product may be prepared for example by reacting diphenyl oxide with a chlorinating agent (e.g. chlorine) and with a butylating agent (e.g. butylene, isobutylene) in a manner well known for halogenating and alkylating aromatic moieties. It will be understood that other halogens such as bromine, iodine and fluorine, and other alkyls such as n- and iso- propyl, -amyl and -hexyl, may be respectively substituted for the chloro and butyl groups.

Any epoxy-containing stabilizer or scavenger may be employed as component (c) herein, including for example those disclosed in U.S. Pat. Nos. 2,840,627, 3,242,401, 3,242,402 and 3,568,015, and French Pat. No. 1,359,579. These stabilizing agents generally have the formula

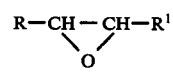

wherein R and $R^1$ may be hydrogen, alkyl, alkoxy, phenoxy, and substituted derivatives thereof. Illustratively, there may be employed epoxidized natural unsaturated oils having no remaining unsaturation, such as epoxidized soybean oil, available commercially as Estynox 203 (Baker Castor Oil Company), and preferably 1,1,2,2-tetra (p-2,3-epoxypropyoxyphenyl) ethane and isomers and homologs thereof, available commercially as Epon Resin 1031 (Shell Chem. Co.), and more preferably 4,4'-bis (2,3-epoxypropoxy) diphenyl dimethyl methane, the reaction product of 1 mol of Bis-Phenyl A with 2 mols of epichlorhydrin, available commercially as Epon 825 (Shell Chem. Co.).

The liquid dielectric compositions of this invention may be simply prepared by mixing suitable proportions of the defined components (a), (b) and (c) in any order, and used in known manner in any electrical device requiring dielectric or electrical insulation properties including for example wires, cables, capacitors and the like. All such devices are or contain one or more electrically conductive parts, typically metal such as aluminum, copper, silver or the like, which require insulation in the form for example of a liquid dielectric composition and/or a solid dielectric material such as woven or unwoven fibrous material (e.g. paper) or plastic film (e.g. polyolefins including polyethylene, polypropylene, polyisopropylene, polyisobutylene and the like, preferably biaxially oriented, polyesters such as polyethylene terephthalate, etc.) impregnated with such liquid dielectric composition and in which the electrically conductive part is encased, embedded, encapsulated, coated, or submerged or the like.

For best results, these dielectric compositions of the present invention should, when used in an electrical device such as a capacitor be first treated to remove traces of water and other ionic or highly polar molecules, for example by filtering through attlapulgus clay or Fuller's earth or diatomaceous earth. For similar reasons, the device comprising a sealed vessel, container, casing or housing containing the electrically conductive part or parts is preferably first thoroughly evacuated to remove air and other gaseous and volatile materials as by heating it at an elevated temperature above 100° C., such as about 110° to 115° C., for an extended period such as about 20 hours or more at atmospheric pressure, evacuating it at such temperatures down to a subatmospheric pressure of about 100 microns Hg absolute or less for about 50 to 60 hours, charging, injecting, impregnating or flooding it with the dielectric composition at an elevated temperature of about 80° to 85° C. while at said subatmospheric pressure, raising the pressure to atmospheric while still hot, allowing it to cool, and sealing the vessel before or after cooling.

The invention is particularly effective in providing capacitors with improved dielectric properties while avoiding the use of PCB and similar halogenated aromatic hydrocarbons. The capacitors, of known structure, may be described as sealed vessels or containers containing a plurality of electrically conductive parts, specifically metal foil electrodes, alternating with layers of solid dielectric material such as paper sheet or plastic film or combinations of paper and plastic, the voids or remaining space in the vessels being filled, according to the present invention, with the dielectric compositions and in the manner described above. When a paper sheet interlayer is employed, it is preferably adsorbent, which property can for example be obtained by incorporating in the papermaking process about 0.1 to 10% by weight of finely divided (averaging 2.0 microns or less) particles of inorganic adsorbent substances such as aluminum hydroxides, hydrated aluminum oxides, aluminum oxides, aluminum silicates, including such forms as bentonite, attapulgite and Fuller's earth, or mixtures thereof. Such capacitor grade papers, e.g. kraft, are commercially available as Weyerhaeuser "O" grade, Schweitzer "Edsorb" or Stevens "Stabilized" paper.

Representative epoxy stabilizers, capacitor structures, dielectric dehydrating and capacitor evacuating and impregnating procedures operative herein are for example disclosed in U.S. Pat. No. 3,568,015 issued to a coinventor hereof, which disclosures are incorporated herein by reference thereto.

It will be understood that the following examples are only illustrative and not limitative. The examples in TABLE I below show the results of testing 10 AC capacitors rated at 35 microfarads (MFD) capacity for operation at 370 volts AC containing windings of aluminum foil electrodes alternating with multiple layers of capacitor grade kraft paper dielectric material and constructed, filled with a liquid dielectric composition and sealed as shown and described in U.S. Pat. No. 3,568,015 except that in Examples 1–5 the liquid dielectric composition, according to the present invention, is composed of about 0.6% of Shell Epon 825 epoxide stabilizer, the balance being ⅔ Exxon ENJ 2065 dielectric and ⅓ Dow XFS 4169L dielectric. In comparative Examples 6–10, the liquid dielectric composition is composed of 0.6% Shell Epon 825 and the balance Exxon ENJ 2065. All voltages test satisfactory at 1100 volts DC, and operating voltage (Schering Bridge) is 370 volts AC, 60 cycles per second. Column 6 shows the results of a life test carried to 434 hours at 80° C. and 490 volts AC. The capacity and power factor test results shown in columns 2, 3 and 5 are determined at 10 volts AC.

TABLE I

| 1 | 2 | 3 | 4 | 5 | 6 | 7 | 8 | 9 | 10 |
|---|---|---|---|---|---|---|---|---|---|
| Example | CAP. MFD 25° C. 60 cps | P.F. % 25° C. 60 cps | IR-MEGS 25° C. 200 vdc | P.F. % 100° C. 60 cps | FAILED LIFE HRS | CAP. MFD 25° C. | P.F. % 25° C. | CAP. MFD 100° C. | P.F. % 100° C. |
| 1 | 31.8 | .35 | 580 | .38 | 197 | 32.01 | .413 | 30.20 | .339 |
| 2 | 31.6 | .35 | 880 | .38 | 388 | 31.80 | .423 | 29.96 | .334 |
| 3 | 31.7 | .35 | 740 | .38 |  | 32.01 | .353 | 30.01 | .339 |
| 4 | 31.5 | .35 |  | .38 | 434 | 31.61 | .355 | 29.82 | .339 |
| 5 | 31.7 | .35 |  | .38 |  | 31.96 | .361 | 30.01 | .347 |
| COMPARATIVE | | | | | | | | | |
| 6 | 31.6 | .37 | 500 | .72 | 16 | 31.93 | .353 | 30.77 | .356 |
| 7 | 31.7 | .37 | 640 | .72 | 93 | 32.08 | .359 | 31.00 | .351 |
| 8 | 31.6 | .37 | 740 | .72 | 36 | 31.78 | .410 | 30.45 | .362 |
| 9 | 31.7 | .37 |  | .72 | 36 | 31.86 | .413 | 30.56 | .350 |
| 10 | 31.7 | .37 |  | .72 | 266 | 32.06 | .371 | 30.69 | .350 |

In the above table, CAP. means capacity, MFD means microfarads, cps means cycles per second, P.F. means power factor, IR means insulation resistance, MEGS means megohms, vdc means volts D.C., and vac means volts AC. Units 3 and 5 survived 471 hours.

The results in TABLE I show significant and unexpected superiority of the dielectric compositions of the present invention (Examples 1–5) with respect to the life characteristics at 80° C. Increased life is highly significant, 4 of the 5 capacitors made with ENJ 2065 impregnant (Examples 7–10) failing after only brief test, in contrast to capacitors made under the invention, 4 of which (Examples 2–5) exceeded 380 hours.

This invention has been disclosed with respect to preferred embodiments and it will be understood that modifications and variations thereof obvious to those skilled in the art are to be included within the spirit and purview of this application and the scope of the appended claims.

What is claimed is:

1. A liquid dielectric composition useful as a capacitor impregnant consisting essentially of, approximately by weight:
  a. 97 to 51 parts of a bis ($C_{6-12}$ alkyl) phthalate;
  b. 2 to 48 parts of butylated monochloro diphenyl oxide; and
  c. 0.001 to 5 parts of epoxide stabilizer.

2. A composition as defined in claim 1 containing about 80 to 60 parts of (a), 18 to 38 parts of (b) and 0.01 to 2.0 parts of (c).

3. A composition as defined in claim 1 containing about 70 to 65 parts of (a), 28 to 34 parts of (b) and 0.5 to 1.0 parts of (c).

4. A composition as defined in claim 3 wherein component (a) is diisononyl phthalate.

5. A composition as defined in claim 1 wherein component (a) is diisononyl phthalate.

6. An electrical device comprising at least one electrically conductive part insulated by a composition as defined in claim 1.

7. An electrical device comprising at least one electrically conductive part insulated by solid dielectric material impregnated with a composition as defined in claim 1.

8. An electrical device comprising a plurality of electrically conductive parts separated by solid dielectric material impregnated with a composition as defined in claim 1.

9. A device as defined in claim 8 in the form of a capacitor, said electrically conductive parts being metal foil electrodes and said solid dielectric material being at least one member of the group consisting of paper sheet and plastic film.

10. A device as defined in claim 9 wherein component (a) is diisononyl phthalate.

11. A capacitor comprising a sealed vessel containing a plurality of metal foil electrodes alternating with layers of at least one solid dielectric material selected from the group consisting of paper sheet and plastic film, the voids in said vessel being filled with a composition as defined in claim 1.

* * * * *